United States Patent
Hwang et al.

(10) Patent No.: US 6,497,980 B2
(45) Date of Patent: Dec. 24, 2002

(54) ORGANIC ELECTROLYTIC SOLUTION AND LITHIUM SECONDARY BATTERY ADOPTING THE SAME

(75) Inventors: Duck-Chul Hwang, Chungcheongnam-do (KR); Ki-Ho Kim, Chungcheongnam-do (KR); Byung-Hyun Kang, Chungcheongnam-do (KR); Jea-Woan Lee, Chungcheongnam-do (KR); Yong-Beom Lee, Chungcheongnam-do (KR); Se-Jong Han, Chungcheongnam-do (KR); In-Sung Lee, Chungcheongnam-do (KR)

(73) Assignee: Samsung SDI Co., Ltd., Kyungki-Do (KR)

(*) Notice: Subject to any disclaimer, the term of this patent is extended or adjusted under 35 U.S.C. 154(b) by 182 days.

(21) Appl. No.: 09/768,298

(22) Filed: Jan. 25, 2001

(65) Prior Publication Data

US 2001/0024757 A1 Sep. 27, 2001

(30) Foreign Application Priority Data

Mar. 6, 2000 (KR) .......................................... 00-11041

(51) Int. Cl.[7] ............................................. H01M 10/40

(52) U.S. Cl. ...................... 429/332; 429/306; 429/324; 429/325

(58) Field of Search .............................. 429/306, 324, 429/325, 332

(56) References Cited

FOREIGN PATENT DOCUMENTS

JP          03240983    * 10/1991  ............. C25B/3/02

* cited by examiner

Primary Examiner—Carol Chaney
Assistant Examiner—Dah Wei D. Yuan
(74) Attorney, Agent, or Firm—Leydig, Voit & Mayer, Ltd.

(57) ABSTRACT

An organic electrolytic solution and a lithium secondary battery employing the same are provided. The organic electrolytic solution contains an organic solvent and a lithium salt and the organic solvent includes 20 to 60% by volume of ethylene carbonate, 20 to 70% by volume of dialkyl carbonate and 5 to 30% by volume of a fluorinated toluene compound. The organic electrolytic solution has improved high-temperature exposure characteristic by virtue of the use of a fluorinated toluene compound having a high boiling point in combination with mixed solvents of ethylene carbonate and dialkyl carbonate. The lithium secondary battery employing the organic electrolytic solution is excellent in the high-temperature exposure characteristic, while maintaining good discharge capacity and lifetime characteristics.

8 Claims, 1 Drawing Sheet

ORGANIC ELECTROLYTIC SOLUTION AND LITHIUM SECONDARY BATTERY ADOPTING THE SAME

BACKGROUND OF THE INVENTION

1. Field of the Invention

The present invention relates to an organic electrolytic solution and a lithium secondary battery employing the same, and more particularly, to an organic electrolytic solution containing a fluorinated toluene compound and a lithium secondary battery having excellent lifetime and discharge capacity characteristics and improved high-temperature exposure characteristics obtained by employing the organic electrolytic solution.

2. Description of the Related Art

Accompanying the technological development of portable electronic devices which have become miniaturized and lightweight, high performance secondary batteries for supplying power to those portable electronic devices are in high demand, and research into lithium secondary batteries is being made intensively.

A lithium secondary battery is constructed by a cathode, an anode, an organic electrolytic solution for providing a movement path of lithium ions between the cathode and the anode, and a separator. Electrical energy is generated by an oxidation/reduction reaction when lithium ions are intercalated/deintercalated into/from the cathode and anode. The lithium secondary batteries are classified according to the kind of electrolyte used, into lithium ion batteries using liquid electrolyte and lithium ion polymer batteries. Since the lithium ion polymer batteries use solid electrolyte, they are free from the risk of leakage of an electrolytic solution, and have excellent processibility to be easily formed as a battery pack. Also, the lithium ion polymer batteries are lightweight and less bulky and have very small self-discharge rates. Due to such properties, the lithium ion polymer batteries are safe and can be easily fabricated as rectangular batteries and large-sized batteries, compared to the lithium ion batteries.

In the lithium secondary battery, a cathode and an anode are formed of materials capable of intercalating and deintercalating lithium ions. Materials for forming electrodes will now be described. First, as the cathode active material, lithium-containing metal oxides such as $LiCoO_2$, $LiMn_2O_4$, $LiNiO_2$ or $LiMnO_2$, can be used. Among the lithium-containing metal oxides, a manganese group material such as $LiMn_2O_4$ or $LiMnO_2$ has an undesirably small capacity, whereas it can be easily synthesized and is cheap and environmentally benign. Also, a cobalt group material such as $LiCoO_2$ is expensive, while having excellent electric conductivity and voltage characteristics. In spite of the advantages of cost efficiency or high discharge capacity, a nickel group material such as $LiNiO_2$ cannot be easily synthesized and must ensure the safety of a battery due to its high discharge capacity.

As the anode active material, metallic lithium, lithium alloys or carbon materials can be used. However, metallic lithium has a problem of short circuiting caused by formation of dendrites, which entails a danger of explosion of a battery. Thus, recently, carbon materials have been more favorably used as the anode active materials.

Since the properties of a lithium secondary battery are due to complex reactions between a cathode and an electrolytic solution or between an anode and an electrolytic solution, use of an appropriate organic electrolytic solution is one of important factors for improving the performance of the lithium secondary battery. The organic electrolytic solution is an ion-conductor prepared by dissolving lithium salts in an organic solvent and should be excellent in view of conductivity of lithium ion and chemical and electrochemical stability with respect to electrodes. Also, the organic electrolytic solution must be cheap and usable over a broader range of the working temperature. Thus, an organic solvent having high ion conductivity and dielectric constant and low viscosity, is preferably used as the organic solvent consisting of the organic electrolytic solution.

However, there is no single organic solvent which can satisfy the above-described requirements in practice. Thus, the composition of an organic solvent contained in the organic electrolytic solution may include a two-component system comprising a high dielectric constant solvent and a low viscosity solvent (see U.S. Pat. No. 5,437,945), or a three-component system further comprising a third organic solvent having a low boiling point in addition thereto (see U.S. Pat. No. 5,474,862). Use of such mixed organic solvents increases the mobility of lithium ions, leading to improvement of ion conductivity, and enhances the initial discharge capacity of a battery.

It has been known that the lifetime and capacity characteristics of a battery are importantly influenced by the surface reactivity between the carbon material used as the anode active material and the electrolytic solution, in the lithium secondary battery, in particular, the lithium ion battery. Thus, reaction of the anode active material and the electrolytic solution, rather than reaction between the cathode active material and the electrolytic solution, is preferably taken into prior consideration when the composition of an electrolytic solution is selected.

Recently, ethylene carbonate that seldom reacts with the anode active material is more favorably used than propylene carbonate that has reactivity with the anode active material.

The high-temperature exposure characteristic of a battery has become adopted as a new item for evaluating the performance of the battery. The high-temperature exposure characteristic is important because a battery exposed to a high-temperature for a long time cannot be used any longer due to an increase in the internal pressure, resulting in opening of a vent.

SUMMARY OF THE INVENTION

To solve the above problems, it is a first object of the present invention to provide an organic electrolytic solution having improved high-temperature exposure characteristic.

It is a second object of a lithium secondary battery having improved lifetime and discharge capacity characteristics by employing the organic electrolytic solution.

To achieve the first object, there is provided an organic electrolytic solution containing an organic solvent and a lithium salt, wherein the organic solvent comprises 20 to 60% by volume of ethylene carbonate, 20 to 70% by volume of dialkyl carbonate and 5 to 30% by volume of a fluorinated toluene compound.

To achieve the second object, there is provided a lithium secondary battery including a cathode having a lithium-containing metal oxide, an anode having metallic lithium, lithium alloy or a carbon material, and an organic electrolytic solution having a lithium salt and an organic solvent containing 20 to 60% by volume of ethylene carbonate, 20 to 70% by volume of dialkyl carbonate and 5 to 30% by volume of a fluorinated toluene compound.

BRIEF DESCRIPTION OF THE DRAWINGS

The above objects and advantages of the present invention will become more apparent by describing in detail a preferred embodiment thereof with reference to the attached drawing in which.

DESCRIPTION OF THE PREFERRED EMBODIMENT

Figure 1:
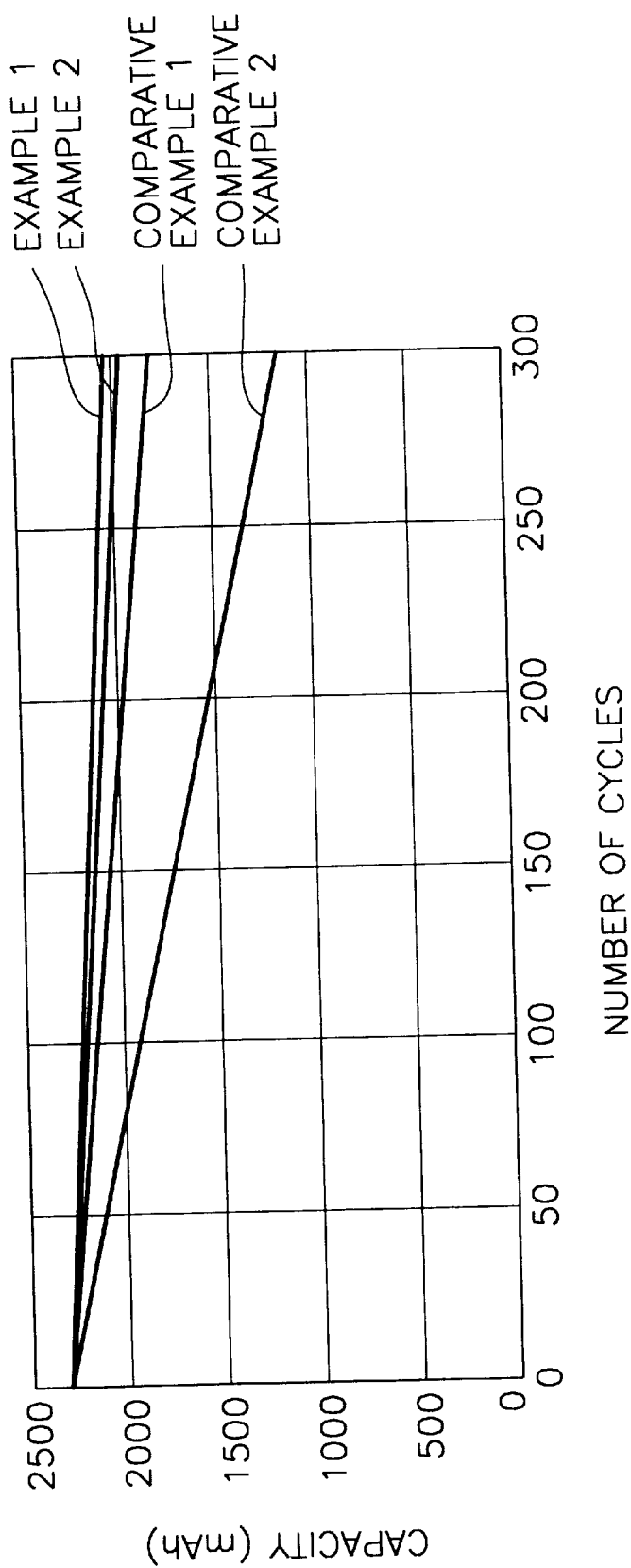
FIG. 1 is a graph showing the change in the capacity characteristic when charging and discharging cycles are repeated, in a lithium secondary battery employing organic electrolytic solutions prepared by Examples 1 and 2 of the present invention and Comparative Examples 1 and 2.

The organic electrolytic solution according to the present invention consists of a lithium salt and an organic solvent and is characterized in that as the organic solvent, a fluorinated toluene compound having a high boiling point is further added to a two-component organic solvent consisting of ethylene carbonate which is a high dielectric constant solvent and dialkyl carbonate which is a low viscosity solvent. Here, as the fluorinated toluene compound, 2-fluorotoluene (boiling point: 113–114° C.), 3-fluorotoluene (boiling point: 115° C.), 4-fluorotoluene (boiling point: 116° C.) or the like is preferably used. Such solvents have a wide potential window so that they exhibit a substantially similar dielectric constant to dimethyl carbonate while being electrochemically stable.

The dialkyl carbonate is a low viscosity solvent which prevents the discharge characteristic of a battery from lowering due to higher viscosity of an organic electrolytic solution, and at least one solvent selected from the group consisting of dimethyl carbonate, diethyl carbonate, dipropyl carbonate, methyl ethyl carbonate and methyl propyl carbonate is preferably used as the low viscosity solvent.

The contents of the respective solvents will now be described. First, the content of ethylene carbonate is 20 to 60% by volume, the content of dialkyl carbonate is 20 to 70% by volume, and the content of the fluorinated toluene compound is 5 to 30% by volume. Here, if the content of ethylene carbonate is less than 20% by volume, the high rate characteristic of a battery is lowered. If the content of ethylene carbonate is greater than 60% by volume, it is difficult to impregnate an electrolytic solution into a separator. If the content of dialkyl carbonate is less than 20% by volume, the high rate and lifetime characteristics are deteriorated. If the content of dialkyl carbonate is greater than 70% by volume, the lifetime and capacity characteristics are deteriorated. Also, if the content of the fluorinated toluene compound is less than 5% by volume, the improving effect of the high-temperature exposure characteristic is negligible. If the content of the fluorinated toluene compound is greater than 30% by volume, the irreversibility increases and the lifetime characteristic becomes poor.

The lithium salt composing the organic electrolytic solution of the present invention is not specifically restricted, but is at least one lithium salt selected from the group consisting of $LiPF_6$, $LiBF_4$, $LiAsF_6$, $LiClO_4$, $CF_3SO_3Li$, $LiC(CF_3SO_2)_3$, $LiN(C_2F_5SO_2)_2$ and $LiN(CF_3SO_2)_2$, and the concentration of the lithium salt in the organic solvent is preferably 0.5 to 2.0M. If the content of the lithium salt is less than 0.5 M, the capacity of a battery is poor. If the content of the lithium salt is greater than 2.0 M, the lifetime characteristic of a battery is undesirably deteriorated.

A lithium secondary battery employing the organic electrolytic solution according to the present invention will now be described.

First, a cathode active material, a conductive agent, a binder and a solvent were mixed to prepare a cathode active material composition. The cathode active material composition was directly coated on an aluminum current collector and dried to prepare a cathode plate. Alternatively, the cathode active material composition was cast on a separate support body and then a film obtained by being peeled off from the support body was laminated on an aluminum current collector to prepare a cathode plate. Here, a mylar film may be used as the support body.

The cathode active material is a lithium-containing metal oxide, and usable lithium-containing metal oxides include $LiNi_{1-x}Co_xM_yO_2$ wherein x=0 to 0.2, M=Mg, Ca, Sr, Ba or La, and y=0.001 to 0.02, $LiCoO_2$, $LiMn_xO_{2x}$ wherein x=1 or 2, or $LiNi_xMn_yO_4$ wherein x=0 to 0.5 and y=1.5 to 2. Also, carbon black is preferably used as the conductive agent. Vinylidene fluoride-hexafluoropropylene copolymer, polyvinylidene fluoride, polyacrylonitrile, polymethyl methacrylate, polytetrafluoroethylene, and mixtures thereof, are preferably used as the binder. As the solvent, N-methylpyrrolidone, acetone or the like is used. Here, the contents of the cathode active material, the conductive agent, the binder and the solvent are in the ranges conventionally applied for the lithium secondary batteries.

Similarly, an anode active material, a conductive agent, a binder and a solvent were mixed to an anode active material composition. Then, the anode active material composition was directly coated on a copper current collector or cast on a separate support body. An anode active material film obtained by being peeled off from the support body was laminated on a copper current collector to prepare an anode plate.

Metallic lithium, lithium alloys or carbon materials may be used as the anode active material. Specifically usable anode active materials include a carbon material obtained by carbonizing mesophase spherical particles, or graphite fiber obtained by carbonizing and graphiting mesophase pitch fiber, which is preferably a material having an interplanar distance d002 of 3.35 to 3.38 Å and a crystallite size Lc of approximately 20 nm in X-ray diffraction analysis, and exhibiting exothermic peaks at 700° C. or higher when measured by means of a differential thermal analyzer. Also, the same conductive agent, binder and solvent as those for cathode active material composition are used. In some cases, a plasticizer may be further added to the cathode active material composition or the anode active material composition to form pores in the electrode plates.

As the separator, any one that is used conventionally in lithium secondary batteries can be used. In other words, in the case of fabricating a lithium ion battery, a separator made of a windable material such as polyethylene or polypropylene can be used. In the case of fabricating a lithium ion polymer battery, a separator having excellent capability of impregnating an organic electrolytic solution may be used. Such separators can be prepared in the following manner.

In other words, polymer resin, a filler, a plasticizer and a solvent are mixed to prepare a separator composition. The separator composition is directly coated and dried to form a separator film. Alternatively, the separator composition is cast on a separate support body and dried, and then a separator film obtained by being peeled off from the support body is laminated on the electrode, thereby obtaining the separator.

The polymer resin is not specifically restricted but any material that is used as the binder of an electrode plate can be used. Usable polymer resin includes vinylidene fluoride-hexafluoropropylene copolymer, polyvinylidene fluoride, polyacrylonitrile, polymethyl methacrylate, polytetrafluoroethylene, and mixtures thereof. Specifically, vinylidene fluoride-hexafluoropropylene copolymer containing 8 to 25% by weight of hexafluoropropylene is preferably used.

Then, a separator is disposed between the cathode plate and the anode plate to form an electrode assembly. The electrode assembly is wound or folded to then be put into a cylindrical battery case or rectangular battery case, and then the organic electrolytic solution is injected into the resultant structure, thereby completing a lithium ion battery. Alternatively, the electrode assemblies are stacked in a bi-cell structure and then impregnated into an organic electrolytic solution. Then, the resultant structure is put into a pouch and hermetically sealed, thereby completing a lithium ion polymer battery.

The present invention will now be described through the following examples and is not limited thereto.

EXAMPLE 1

A reagent box containing solid-state ethylene carbonate was put into an electric mantle and then heated slowly to 70 to 80° C. to be liquefied. Subsequently, $LiPF_6$ was put into a plastic box for storing an electrolytic solution at a concentration so as to form a 1 M $LiPF_6$ solution and dimethyl carbonate and 4-fluorotoluene were added thereto and violently stirred to dissolve $LiPF_6$, to prepare an organic electrolytic solution. Here, the volume ratio of ethylene carbonate, dimethyl carbonate and 4-fluorotoluene was adjusted to be 45:45:10.

EXAMPLE 2

An organic electrolytic solution was prepared in the same manner as in Example 1, with the exception of diethyl carbonate being used instead of dimethyl carbonate.

EXAMPLE 3

An organic electrolytic solution was prepared in the same manner as in Example 1, with the exception of 2-fluorotoluene being used instead of 4-fluorotoluene.

EXAMPLE 4

An organic electrolytic solution was prepared in the same manner as in Example 1 with the exception of 3-fluorotoluene being used instead of 4-fluorotoluene.

COMPARATIVE EXAMPLE 1

A reagent box containing solid-state ethylene carbonate was put into an electric mantle and then heated slowly to 70 to 80° C. to be liquefied. Subsequently, $LiPF_6$ was put into a plastic box for storing an electrolytic solution at a concentration so as to produce a 1M $LiPF_6$ solution and dimethyl carbonate was added thereto and violently stirred to dissolve $LiPF_6$, to prepare an organic electrolytic solution. Here, the volume ratio of ethylene carbonate and dimethyl carbonate was adjusted to be 50:50.

COMPARATIVE EXAMPLE 2

An organic electrolytic solution was prepared in the same manner as in Comparative Example 1, with the exception of a mixed solvent of diethyl carbonate and propylene carbonate being used instead of dimethyl carbonate. Here, the volume ratio of ethylene carbonate, diethyl carbonate and propylene carbonate was adjusted to be 45:45:10.

The initial discharge capacity, lifetime and high-temperature exposure characteristics of the organic solvents prepared by Examples 1 through 4 and Comparative Examples 1 and 2 were evaluated in the following manner.

(1) Discharge Capacity and Charging/Discharging Lifetime Characteristics

In order to evaluate the charging/discharging lifetime characteristics of batteries employing the organic electrolytic solutions prepared by Examples 1 through 4 and Comparative Examples 1 and 2, lithium secondary batteries were fabricated in the following manner.

Lithium nickel cobalt oxide, carbon black, vinylidenefluoride-hexafluoropropylene copolymer and N-methylpyrrolidone were mixed to prepare a cathode active material composition and then coated on an aluminum foil. Then, the resultant structure was dried, rolled and cut to fabricate a cathode.

Separately, graphite powder, vinylidenefluoride-hexafluoropropylene copolymer and N-methylpyrrolidone were mixed to prepare an anode active material composition and then coated on a copper foil. Then, the resultant structure was dried, rolled and cut to fabricate an anode.

Then, a separator made of polyethylene was interposed between the cathode and the anode and wound in a jelly-roll type configuration to make an electrode assembly. Subsequently, an organic electrolytic solution was injected into a space of a can accommodating the electrode assembly, thereby completing a cylindrical lithium ion battery. Here, as the organic electrolytic solution, 4.0–4.5 g of an electrolytic solution obtained by dissolving 1.3M $LiPF_6$ in a mixed solvent of ethylene carbonate and dimethyl carbonate in a weight ratio of 1:1 was used.

The discharge capacity and the capacity change after conducting 300 charging and discharging cycle tests of the thus-fabricated battery were measured and expressed as values relative to the initial discharge capacity. The charger/discharger (Maccor Co.) having a capacity of 1A was used. Also, the charging and discharging test was performed at 25° C. at a rate of 1 C, and the charging voltage was 2.75~4.2V.

The measured initial discharge capacities and lifetime characteristics of organic electrolytic solutions prepared by Examples 1 and 2 and Comparative Examples 1 and 2 are shown in Table 1. FIG. 1 shows the lifetime characteristics of organic electrolytic solutions prepared by Examples 1 and 2 and Comparative Examples 1 and 2.

(2) High-Temperature Exposure Characteristic

The batteries fabricated by using the organic electrolytic solutions prepared by Examples 1 and 2 and Comparative Examples 1 and 2 were allowed to stand at 85° C. for 96 hours. Then, the time taken until each vent was opened was measured to evaluate high-temperature exposure characteristics of the batteries, and the results thereof are shown in Table 1.

TABLE 1

| | Lifetime characteristic (%) | Initial discharge capacity (mAh/g) | High-temperature exposure characteristic |
|---|---|---|---|
| Example 1 | 88 | 2309 | Vent opened after 24 hours |
| Example 2 | 85 | 2305 | Vent not opened |
| Comparative Example 1 | 78 | 2321 | Vent opened in 2 hours |
| Comparative Example 2 | 50 | 2315 | Vent not opened |

It can be seen from Table 1 that the battery of Comparative Example 1 had poor high-temperature exposure characteristic, that is, the vent is opened in 2 hours after being exposed to higher temperatures while having good capacity and lifetime characteristics, and the battery of Comparative Example 2 had very poor lifetime characteristic while having excellent capacity and high-temperature exposure characteristics. On the other hand, compared to the battery of Comparative Example 1, the batteries of Examples 1 and 2 had improved high-temperature exposure characteristics and excellent lifetime and initial discharge capacity characteristics. In particular, the battery of Example 2 in which diethyl carbonate and 4-fluorotoluene were used, showed noticeable improvement in the high-temperature exposure characteristic. Referring to FIG. 1, it was confirmed that the batteries of Examples 1 and 2 had better lifetime characteristics than the batteries of Comparative Examples 1 and 2.

As described above, the organic electrolytic solution according to the present invention has improved high-temperature exposure characteristic by including a fluorinated toluene compound having a high boiling point with mixed solvents of ethylene carbonate and dialkyl carbonate. The lithium secondary battery employing the organic electrolytic solution is excellent in the high-temperature exposure characteristic, while maintaining good discharge capacity and lifetime characteristics.

Although the present invention has been described with reference to the preferred examples, the foregoing disclosure should be interpreted as illustrative only and it should be understood that various modifications and variations can be easily made by those skilled in the art without departing from the spirit of the invention. Accordingly, a true scope and spirit of the invention should be defined by the following claims.

What is claimed is:

1. An organic electrolytic solution containing an organic solvent and a lithium salt, wherein the organic solvent comprises 20 to 60% by volume of ethylene carbonate, 20 to 70% by volume of dialkyl carbonate and 5 to 30% by volume of a fluorinated toluene compound.

2. The organic electrolytic solution according to claim 1, wherein the fluorinated toluene compound is at least one selected from the group consisting of 2-fluorotoluene, 3-fluorotoluene and 4-fluorotoluene.

3. The organic electrolytic solution according to claim 1, wherein the dialkyl carbonate is at least one selected from the group consisting of dimethyl carbonate, diethyl carbonate, dipropyl carbonate, methyl ethyl carbonate and methyl propyl carbonate.

4. The organic electrolytic solution according to claim 1, wherein the lithium salt is at least one compound selected from the group consisting of $LiPF_6$, $LiBF_4$, $LiAsF_6$, $LiClO_4$, $CF_3SO_3Li$, $LiC(CF_3SO_2)_3$, $LiN(C_2F_5SO_2)_2$ and $LiN(CF_3SO_2)_2$, and the concentration of the lithium salt is 0.5 to 2.0 M.

5. A lithium secondary battery comprising:
a cathode having a lithium-containing metal oxide;
an anode having metallic lithium, lithium alloy or a carbon material; and
an organic electrolytic solution having a lithium salt and an organic solvent containing 20 to 60% by volume of ethylene carbonate, 20 to 70% by volume of dialkyl carbonate and 5 to 30% by volume of a fluorinated toluene compound.

6. The lithium secondary battery according to claim 5, wherein the fluorinated toluene compound is at least one selected from the group consisting of 2-fluorotoluene, 3-fluorotoluene and 4-fluorotoluene.

7. The lithium secondary battery according to claim 5, wherein the dialkyl carbonate is at least one selected from the group consisting of dimethyl carbonate, diethyl carbonate, dipropyl carbonate, methyl ethyl carbonate and methyl propyl carbonate.

8. The lithium secondary battery according to claim 5, wherein the lithium salt is at least one compound selected from the group consisting of $LiPF_6$, $LiBF_4$, $LiAsF_6$, $LiClO_4$, $CF_3SO_3Li$, $LiC(CF_3SO_2)_3$, $LiN(C_2F_5SO_2)_2$ and $LiN(CF_3SO_2)_2$, and the concentration of the lithium salt is 0.5 to 2.0 M.

* * * * *